United States Patent Office 3,515,030
Patented June 2, 1970

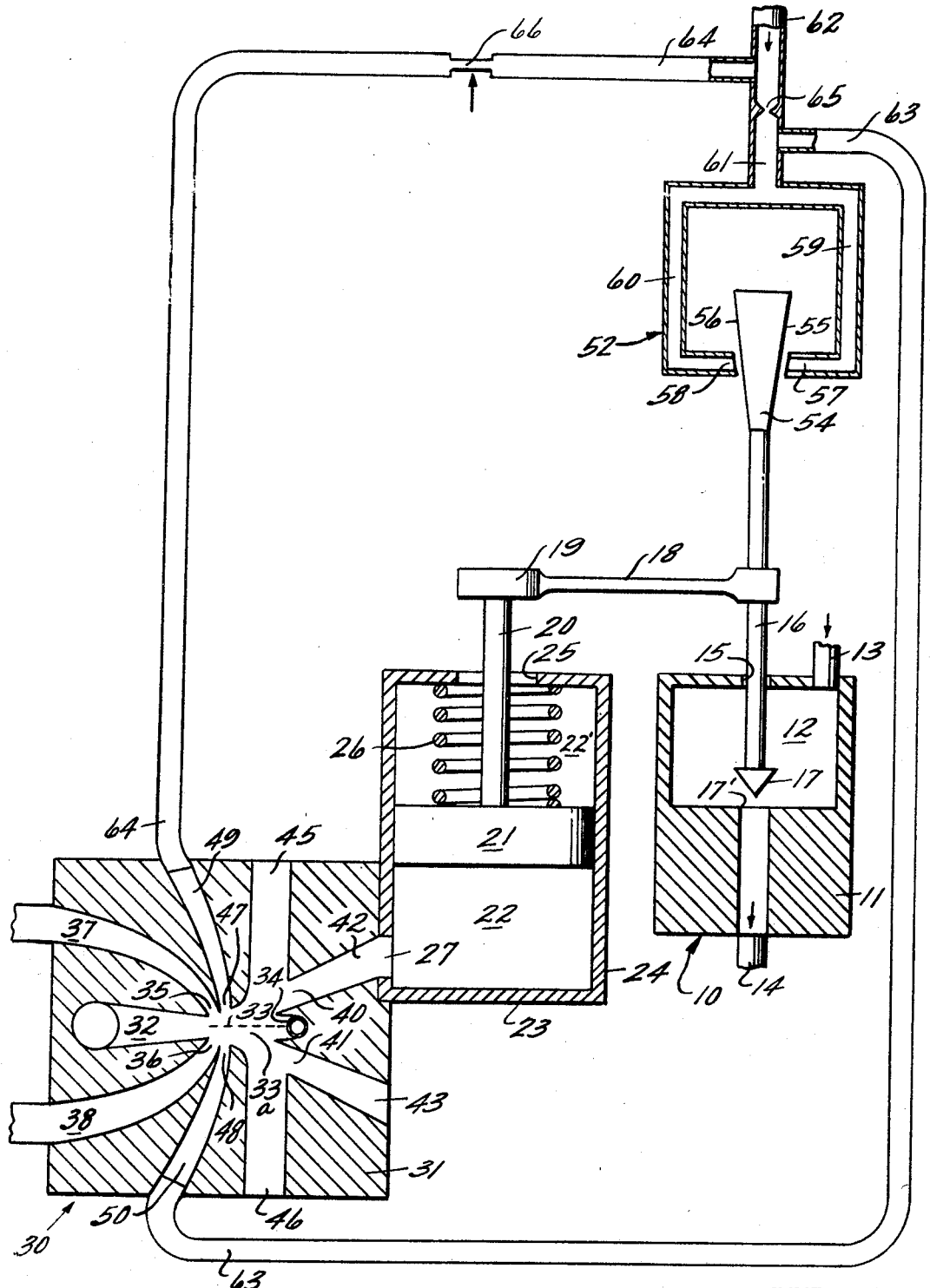

3,515,030
FLUID AMPLIFIER MECHANISM
Willis Anson Boothe, Scotia, N.Y., assignor to General
Electric Company, a corporation of New York
Filed Sept. 23, 1964, Ser. No. 398,608
Int. Cl. F15c 3/00
U.S. Cl. 91—3                                    5 Claims

ABSTRACT OF THE DISCLOSURE

A fluid amplifier position servo is disclosed which comprises a fluid amplifier having a plurality of receivers and control flow inputs, a transducer adapted to be actuated by fluid flow through a selected receiver and control flow means responsive to the positioning of the transducer connected to the control flow input of said fluid amplifier such that when said transducer is correctly positioned said control flow diverts a portion of said fluid flow from said selected receiver.

---

This invention relates to a fluid amplifier system, and more particularly to a system including a mechanism whose position is controlled by a fluid amplifier with a means providing a feedback position signal from the mechanism to the fluid amplifier.

In prime mover control systems and specifically in fluid amplifier type control systems, after the control signal has been generated in determining what motive fluid input must be provided to the prime mover to meet the output requirements it is necessary to provide means for utilization of the control signal for controlling the motive fluid flow to the prime mover. This invention is directed to providing a valve means which is actuated by a fluid amplifier with a feedback mechanism utilizing the control characteristics of the fluid amplifier to provide a position servo mechanism. While the invention is described as pertaining to the motive fluid control input to a prime mover, it should be understood that other uses could be made of such a position servo mechanism, for instance actuators could be so controlled with the control signal being supplied through fluid amplifiers.

It is therefore one object of this invention to provide a fluid amplifier controlled position servo mechanism within a feedback position signal means from the mechanism to the fluid amplifier.

It is another object of this invention to provide a valve mechanism controlled by a fluid amplifier through an interposed transducer with a pressure feedback system between the valve and the fluid amplifier for position monitoring.

In accordance with these and other objects of this invention there is provided a valve actuating system controlled by a fluid amplifier having interposed between the valve and the fluid amplifier a movable member responsive to the output of the fluid amplifier, with pressure sensing means to detect the valve position leading back to control ports of the fluid amplifier to provide a position monitoring servo mechanism.

Other objects and many of the attendant advantages of this invention will be readily appreciated as the same becomes better understood by reference to the following detailed description when considered in connection with the accompanying drawing wherein:

The figure is a cross-sectional view of the fluid amplifier and servo mechanism.

Referring now to the drawing, there is illustrated a valve 10 comprising housing 11 having an internal cavity 12 with a fluid inlet 13 and a fluid outlet 14. Also extending through an opening 15 in the housing leading to the cavity 12 is an actuator rod 16 supporting a valve 17 which interfits with the valve seat 17' connecting with the fluid outlet 14 to form a valve for controlling fluid flow between the fluid inlet 13 and the fluid outlet 14. Naturally as the valve member 17 is moved towards and away from the valve seat 17', the flow of fluid through the valve is controlled. It is the positioning of this valve member 17 to which the subject invention is directed and it should be understood that other mechanisms could be so controlled, and further that even where a valve is controlled such a valve could be utilized in a multiplicity of applications such as the control of steam to a turbine, the control of fuel to an internal combustion engine or the control of fluid to various types of actuators.

An arm 18 is rigidly attached to the actuator rod 16 at connector 19 which in turn is attached to a piston rod 20 extending to a transducer 23. The transducer 23 comprises a housing 24 in which is formed internal cavities 22 and 22' with a connecting opening 25 through which the piston rod 20 extends. A spring 26 is positioned within the cavity 22' between one cavity wall and the piston 21 to bias the piston towards one wall of the cavity. In this manner if no actuating forces other than the spring 26 are acting on the piston, it will always move in the direction to cause the valve member 17 to seat on the valve seat 17' thereby providing a fail closed mechanism. If pressured fluid is injected through an opening 27 in the housing and into the cavity 22 it will act on the piston 21 to force it upward and cause the piston rod 20, the connecting arm 18 and the actuating rod 16 to move upward to move the valve member 17 away from the valve seat 17', opening the valve 10.

To control the flow of pressured fluid into the cavity 22 to actuate the piston 21, a fluid amplifier 30 is provided having a housing 31 in which is positioned a power nozzle 32 through which fluid is applied, preferably under a constant pressure, forming a power jet which normally issues along the dotted line 33 in the cavity 33a to impinge equally between receivers 40 and 41 of the fluid amplifier 30. Indentation 34 is vented to atmosphere or in some manner returns the fluid to the fluid system if desired. Control nozzles 35 and 36 are provided connecting with conduits 37 and 38 in the housing through which control signals may be transmitted in the form of pressured fluid flow to deflect the power jet 33 to one side or the other.

Deflection of the power jet 33 causes it to flow into receiver ports 40 and 41 to which are connected conduits 42 and 43, with conduit 42 leading to the port 27 in the housing of the transducer 23 and conduit 43 leading to atmosphere or to a means for returning the fluid flow to a reservoir or any other portion of the control. Also connecting with the fluid chamber 33a are vents 45 and 46 which communicate with atmosphere or if desired, return the fluid to the fluid system, and serve to drain off any excess fluid from the jet chamber. Control ports 47 and 48 are also provided connecting with conduits 49 and 50 the purpose of which will be explained later.

With the power jet 33 being emitted from the power nozzle 32 and a pressure fluid signal transmitted through the conduit 38 and the control nozzle 36, the power jet 33 will be diverted into the receiver port 40 to flow through the conduit 42 and port 27 into the cavity 22. There will follow a pressure fluid build-up within the cavity to exert a force on piston 21 and cause it to move upward thereby moving with it piston rod 20, the connecting link 18 and the actuator rod 16 to move the valve member 17 and allow flow between inlet 13 and the outlet 14 of the valve 10.

Similarly control fluid flow through the conduit 37 and the control signal port 35 will divert the power jet 33 into the receiver port 41 to pass through the conduit 43. This will permit a pressure reduction to occur within the conduit 42 since no flow is passing therethrough from the receiver port 40, with a pressure reduction following within the cavity 22 to allow the spring 26 to return the piston to a lower position and close the valve member 17 upon the valve seat 17' through the associated linkage. Therefore control fluid flow through the conduits 37 and 38 control the positioning of the piston 21 and the valve member 17.

To provide a position feedback between the valve and the fluid amplifier rod 16 is extended past link 18 to support cam 54 having inclined surfaces 55 and 56. Positioned adjacent these cam surfaces are nozzles 57 and 58 connecting with conduits 59 and 60 which connect with a single conduit 61 to which pressurized fluid is supplied by a suitable means through an inlet 62. Naturally as the cam 54 moves with the rod 16 the cam surfaces 55 and 56 move toward and away from the nozzles 57 and 58 and control the flow of fluid from these nozzles. Therefore as the piston 21 and valve member 17 are moved vertically the control of fluid through the nozzles 57 and 58 is varied by movement of the cam 54. Conduits 63 and 64 connect with the conduit 61 with an orifice 65 positioned therebetween, conduit 64 leads to conduit 49 of the fluid amplifier 30 and conduit 63 leads to conduit 50 of the same fluid amplifier. By the placement of conduit 64 the pressure supplied through the inlet 62 is provided through an adjustable restrictor valve 66 to the conduit 49 of the fluid amplifier 30 and the pressure within the conduits 59 and 60, which compares with pressure within conduit 61 on the down pressure side of orifice 65, is supplied through conduit 63 and conduit 50 to the control port 48 of the fluid amplifier.

Naturally the pressure within the conduit 61 varies with the flow through the nozzles 57 and 58 while the pressure within the conduit 64 remains substantially the same as that supplied through the inlet 62 because of the positioning of the orifice 65. However variance within limits of the pressure supplied through 62 has little effect upon the system since the pressure on both sides of the orifice 65 will vary proportionally with any such pressure change. Also since the cam 54 has opposing surfaces 55 and 56 with facing nozzles 57 and 58 small variances in the cam surfaces or nozzles will not affect the operation of the feedback system.

To explain the operation of the position feedback mechanism 52, as pressured fluid is supplied through the conduit 38 of the fluid amplifier 30, the power jet 33 is diverted into the receiver port 40 to pass into the cavity 22, the piston 21 is raised to move the valve members 17 away from valve seat 17' and allow fluid flow through the valve 10. Moving with the valve member 17 is the cam 54 which by upward movement moves away from the nozzles 57 and 58 to allow more fluid flow through the nozzles causing a pressure reduction within the conduit 61. There is continually applied through the inlets 62 pressured fluid flow which initially passes through the conduits 64 and 49 and restrictor 66 to provide a constant control flow through the control port 47 tending to divert the power jet away from the receiver 40. There also exists a fluid flow through the conduits 63 and 50 tending to counteract this diverting force by a fluid flow through the control port 48. However this pressure decreases as the flow through nozzles 57 and 58 increases thereby allowing the control through the port 47 to have greater influence upon the power jet 33.

At some position of the cam 54, valve member 17 and piston 21 reach an equilibrium position where the total effect of the control fluid flow through the control nozzles 47 and 35 and nozzles 36 and 48 of amplifier 30 cause a diversion of the jet 33 into the receiver 40 to cause the piston and attached mechanism to remain in a stationary position under the equal forces of the spring 26 and the force of fluid pressure in cavity 22. There is thus provided a position feedback signal through the mechanism 52 providing a feedback signal responsive to the positioning of valve member 17 to the fluid amplifier 30 which varies continually with the position of the valve member 17 as controlled by control fluid flow to the fluid amplifier through the conduits 37 and 38.

Therefore there is provided a fluid amplifier system for positioning the valve member 17 by control of the fluid flow signal ot the fluid amplifier and direct utilization of the output of the fluid amplifier, with a servo mechanism provided to constantly monitor the position of the valve member 17 and provide a feedback signal which is effective in cancelling out the control signal to the fluid amplifier when the valve member is correctly positioned.

What is claimed as new and desired to be secured by Letters Patent of the United States is:

1. A fluid control system comprising,
   fluid signal summing means having at least two fluid signal inputs thereto and a fluid pressure output proportional to said inputs,
   an element progressively displaceable in response to said output pressure, from one position to another,
   one of said fluid signal inputs having a strength representing a desired position of said element,
   feedback means for generating a fluid pressure feedback signal having a strength which progressively increases as said element is displaced from one position to another, said feedback signal being connected as the second signal input to said fluid summing means,
   said feedback means comprising a conduit system including a fluid inlet to a first conduit, a fixed orifice in said first conduit downstream of said inlet, at least one venting nozzle in said first conduit downstream of said orifice, a cam connected to said moveable element and variably controlling the discharge area of said nozzle and thus the pressure in said first conduit between said orifice and said venting nozzle, and a second conduit connected at its one end to said first conduit between said orifice and said nozzle and connected at its other end to said summing means to provide the second of said two fluid signal inputs;
   said signal inputs having a predetermined relationship when said element is displaced to the position represented by the strength of said one signal input; and
   said fluid summing means being responsive to the predetermined relationship of said signal inputs to establish said output at a pressure maintaining said element in the position demanded by said one signal.

2. A fluid control system as in claim 1 wherein, the feedback means includes a second venting nozzle connected to the first conduit and also vented to atmosphere,
   said venting nozzles being directed towards each other, and
   said cam being disposed between said venting nozzles and displaced relative thereto, the contour of said cam being the same relative to each nozzle,
   whereby the need for accurate positioning of the cam between the venting nozzles is minimized and yet an accurate feedback signal is provided.

3. A fluid control system as in claim 1 wherein the fluid signal summing means comprise,
   a fluid amplifier having a nozzle from which a power jet is discharged, a receiver downstream of and generally facing said nozzle to provide said pressure output, at least one control port directed towards said power jet and pressurized by said one signal input to deflect the power jet and control said pressure output, a second control port directed towards said power jet and pressurized by said second signal input.

4. A fluid control system as in claim 3 wherein, the one and second fluid signal control ports are on opposite sides of the power jet and increases in the strengths of the signals respectively indicate desired and actual movement of said element towards a given position.

5. A fluid control system as in claim 4 further including, a cylinder, a piston displaceable therein and connected to said element, a spring urging the piston towards one end of the cylinder, and further wherein, said receiver is connected to and pressurizes said one end of the cylinder to displace the piston against the force of said spring, and the relationship between said first and second signals is such as to maintain the receiver pressure force on the piston equal to the spring force thereon when said element is in its desired position.

References Cited

UNITED STATES PATENTS

| | | | |
|---|---|---|---|
| 3,131,601 | 5/1964 | Curran | 91—3 |
| 3,292,648 | 12/1966 | Colston | 137—81.5 X |
| 3,302,398 | 2/1967 | Taplin et al. | 137—81.5 X |
| 2,247,301 | 6/1941 | Lesser | 137—81.5 |
| 3,122,165 | 2/1964 | Horton | 137—81.5 |
| 3,223,103 | 12/1965 | Trinkler | 137—81.5 |

FOREIGN PATENTS 1,278,782  11/1961  France.

M. CARY NELSON, Primary Examiner

W. R. CLINE, Assistant Examiner

U.S. Cl. X.R.

91—388; 137—81.5